May 15, 1962 D. E. DE TEMPLE 3,034,746
HELICOPTER AND CONTROL MECHANISM THEREFOR
Filed March 17, 1958 2 Sheets-Sheet 1
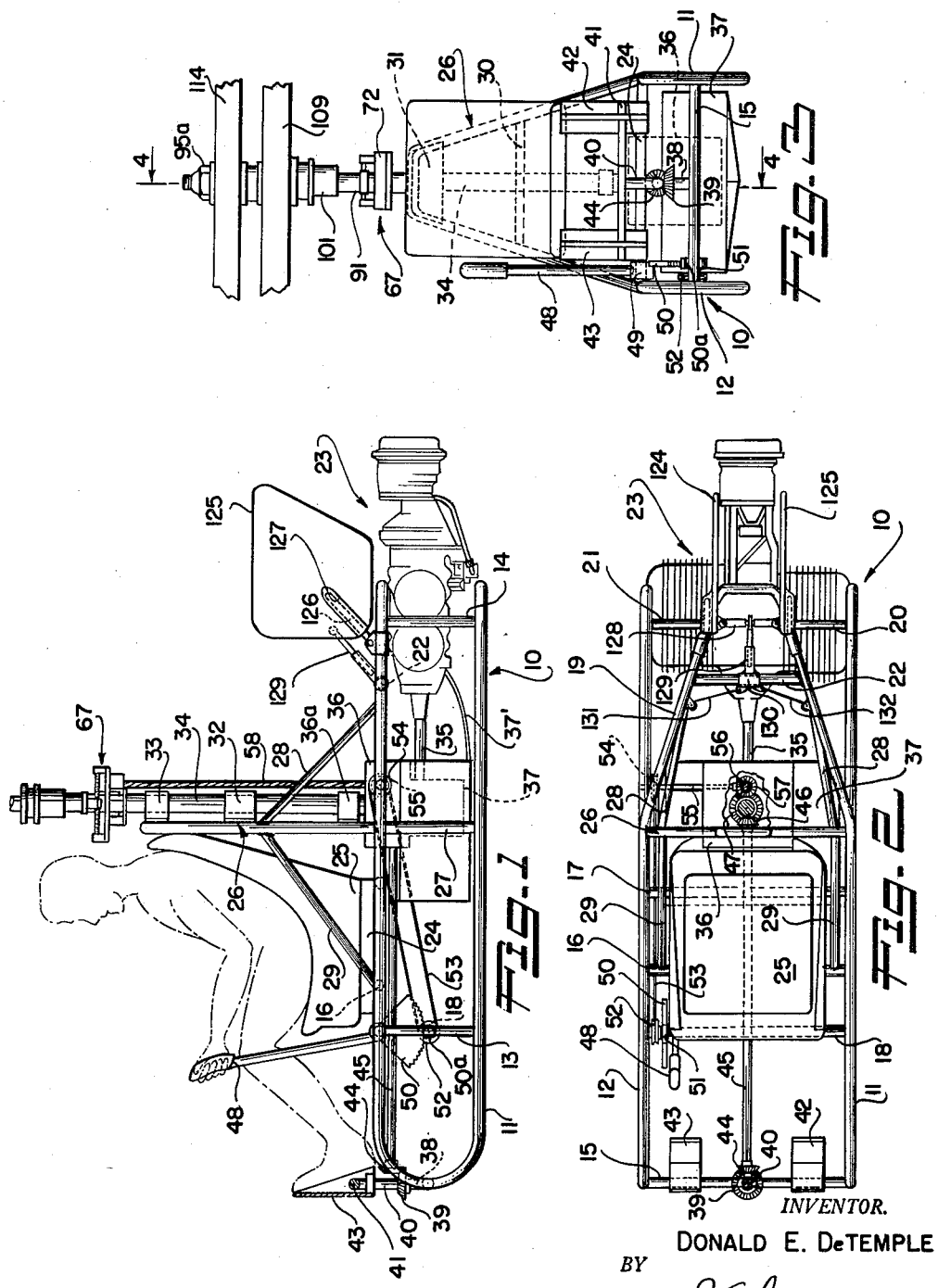
INVENTOR.
DONALD E. DeTEMPLE
BY
R. E. Geangue
Attorney

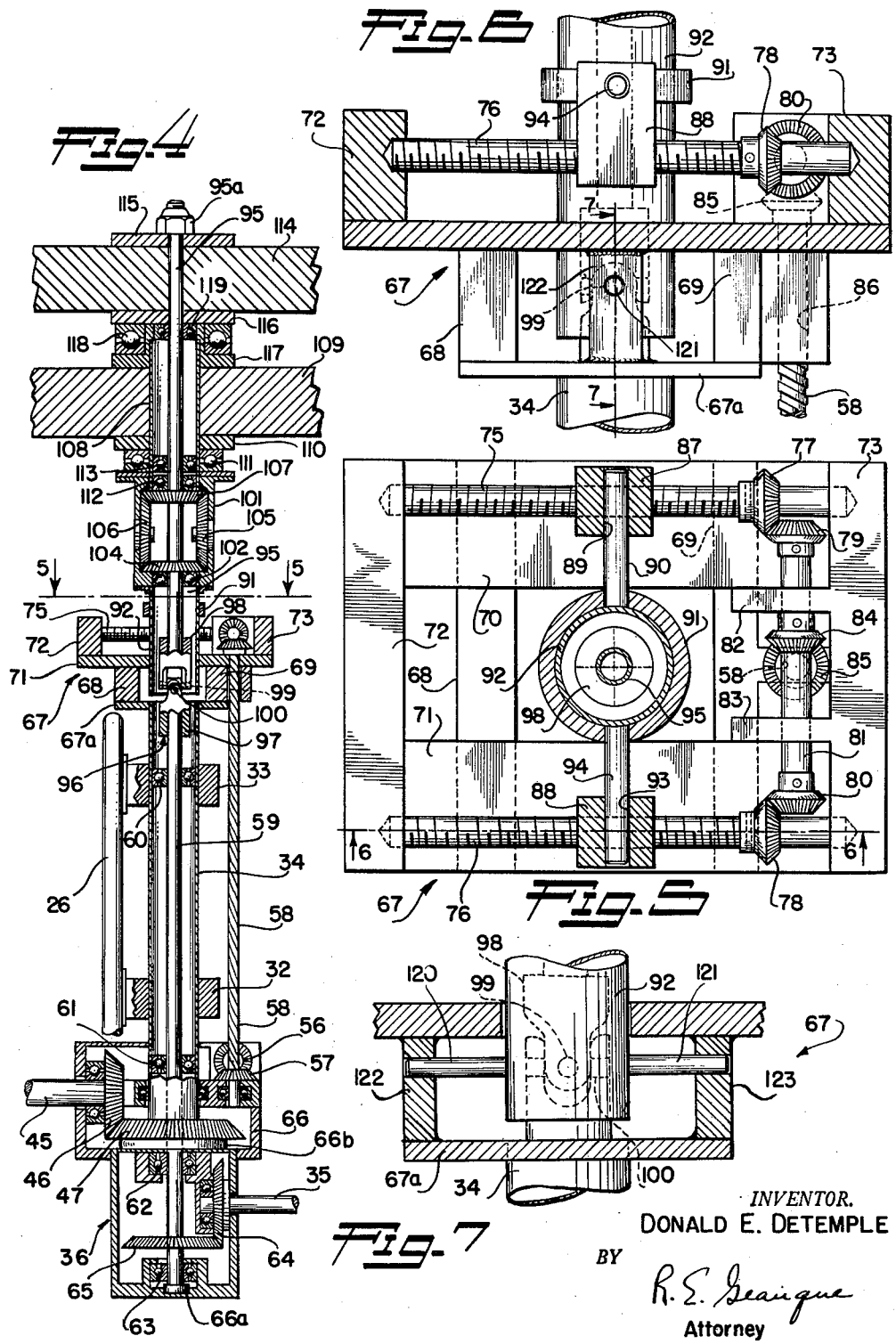

ns patented May 15, 1962

3,034,746
HELICOPTER AND CONTROL MECHANISM
THEREFOR
Donald E. De Temple, Santa Monica, Calif.
(21918 Velicata, Woodland Hills, Calif.)
Filed Mar. 17, 1958, Ser. No. 721,875
7 Claims. (Cl. 244—17.11)

This invention relates to a helicopter and more particularly to a small helicopter of inexpensive construction. In addition, the invention relates to a simplified control mechanism for such a helicopter.

In present helicopters of this type, the various components are not usually arranged to provide for uniform weight distribution about the rotor axis and therefore, various corrections must be made during flight to compensate for the non-uniform weight distribution. In the present invention, the pilot sits forward of the rotor shaft and the engine is located aft of the shaft to compensate for the weight of the pilot. In addition, the fuel tank and gearing for the rotor are located at the axis of the rotor shaft and therefore, these components have no effect on the weight distribution even through the weight of fuel continually decreases during flight.

Also, in present type helicopters, complicated control mechanism is required to tilt the rotor shaft in the desired flight direction by the desired amount. The present invention provides a simplified control mechanism having a carriage which can be rotated to select the desired direction of tilt of the rotor. In addition, the carriage slidably engages the casing for the rotor shaft to tilt the rotor shaft to the desired angle in the direction determined by the position of the carriage. Both the rotation of the carriage and the angle of tilt of the rotor shaft are easily controlled by the pilot or by automatic flight control equipment. The control mechanism is adaptable for use with either a single rotor or with counter rotating rotors.

It is therefore an object of the present invention to provide a helicopter having substantially uniform weight distribution about the axis of the rotor.

Another object of the invention is to provide a helicopter in which the fuel tank is located in line with the rotor axis to prevent change in weight distribution about the axis as the fuel is consumed.

A further object of the invention is to provide a simplified control mechanism for a helicopter by which the desired direction and amount of tilt of the rotor shaft can be easily obtained.

Another object of the invention is to provide a simplified control mechanism for a helicopter having a carriage which is rotatable to determine the direction of rotor tilt and which mounts a device for selecting the amount of rotor tilt.

These and other objects of the invention not specifically set forth above will become readily apparent from the accompanying description and drawings in which:

FIGURE 1 is a side elevational view of the helicopter of the present invention without the rotors and showing the positions of the pilot, engine and fuel tank.

FIGURE 2 is a top plan view of the helicopter of FIGURE 1.

FIGURE 3 is a front elevational view of the helicopter of FIGURE 1 with the rotors attached and showing the pilot operated controls.

FIGURE 4 is an enlarged vertical section along line 4—4 of FIGURE 3 showing the control mechanism and drive shaft for the rotor.

FIGURE 5 is an enlarged sectional view along line 5—5 of FIGURE 4 showing the carriage of the control mechanism.

FIGURE 6 is an enlarged sectional view, partly in elevation, along line 6—6 of FIGURE 5.

FIGURE 7 is an enlarged sectional view, partly in elevation, along line 7—7 of FIGURE 6.

Referring to the embodiment of the invention shown in FIGURES 1–3, the frame 10 of the helicopter comprises two U-shaped side members 11 and 12. Each of the U-shaped members are reinforced by cross members 13 and 14 extending between the legs of each of the U-shaped members. In addition, cross bars 15, 16 and 17 extend between the U-shaped side members and a cross bar 18 extends between the cross members 13 for each of the U-shaped side members. A substantially V-shaped frame member 19 extends rearwardly from the upper legs of the side members 11 and 12 and is secured to a pair of cross pieces 20 and 21, which are also attached to side members 11 and 12 respectively. Also, a support member 22 extends between the legs of the V-shaped member 19. An engine 23 is secured to the frame member 19 and to the side members 11 and 12 by suitable brackets (not shown) and all of the various structural members thus far described provide for rigidity of frame 10.

A seat platform 24 is secured to cross bars 16 and 17 and supports a seat 25 for the operator of the helicopter. An upright support frame 26 is located behind seat 25 and the lower end of each leg 27 of frame 26 connects between the legs of one of the U-shaped members 11, 12. The upright frame 26 is also supported by a pair of braces 28 connected to frame 19 and by a pair of braces 29 extending to cross bar 16. Extending between the legs 27 of frame 26 are cross pieces 30 and 31 which carry brackets 32 and 33, respectively, for the rotor housing 34. The engine 23 is connected by shaft 35 to the gear box 36 which contains the gearing for driving the rotor shaft within the rotor housing and this gear box is contained within fuel tank 37, which is connected by suitable piping 37' to the engine. The gear box 36 is supported by a bracket 36a secured to frame 26 and fuel tank 37 is suitably secured to side members 11 and 12. As illustrated, the gear box is located within the fuel tank so that the fuel tank can be in line with the rotor axis. The rotor shaft within rotor housing 34 defines an axial line approximately at the center of the area confined by the V-shaped frame members 11 and 12 and it is apparent that the engine 23 is located rearwardly of this axial line while the pilot and pilot seat are located forwardly of this axial line. Also, the gear box 36 and the fuel tank 37 are located on the axial line of the rotor shaft. With this arrangement of components, the weight of the motor is counterbalanced by the weight of the pilot and the pilot seat, and since the fuel tank is in the line of the rotor shaft, the fuel weight can decrease during flight without affecting this weight balance.

Referring now to the controls for the helicopter, an upright stub shaft 38 is secured to cross member 15 and rotatably mounts a gear 39 which is connected to a stub shaft 40. The stub shaft 40 is in turn connected to a cross bar 41 which supports foot pads 42 and 43 at its opposite ends. Upon movement of the pads 42 and 43 about the axis of shaft 40 by the feet of the pilot, rotation of gear 39 will result. The gear 39 meshes with a gear 44 secured to one end of a shaft 45, which extends along frame 10 and is rotatably supported thereby with suitable brackets (not shown). The other end of shaft 45 carries a gear 46 which meshes with a gear 47 secured to rotor housing 34. It is therefore apparent that upon rotation of gear 39 by the feet of the pilot, rotation of housing 34 will result.

A hand lever 48 is pivotally mounted on a stub shaft 49 secured to the upper leg of member 12 and carries a gear sector 50 which meshes with gear 50a rotatably mounted by a bushing 51 around cross member 18. The bushing 51 carries a small pulley wheel 52 which receives a cord 53 and this cord extends rearwardly and around a second pulley wheel 54 secured to shaft 55. One end of shaft 55 is rotatably mounted by the upper leg of U-shaped side member 12 and the other end of this shaft carries a gear 56, which meshes with a gear 57 secured to a flexible control shaft 58. It is thus apparent that movement of lever 48 by the pilot will cause rotation of shaft 55 and of flexible control shaft 58 through the described linkage.

In FIGURES 4, 5 and 6 the structure of the control mechanism and of the rotor shaft is enlarged for purposes of description and clarification. In FIGURE 4, the rotor housing 34 is shown supported by the brackets 32 and 33 as previously described. The housing 34 contains rotor shaft 59 which is supported within the housing by ball bearings 60 and 61. The lower end of the rotor shaft 59 extends beyond the lower end of housing 34 and is supported by ball bearings 62 and 63 contained within the gear box 36. The engine shaft 35 extends into gear box 36 and carries a gear 64 which meshes with a gear 65 on the lower end of the rotor shaft 59 in order to transmit power from the engine 23 to the rotor shaft. The housing 66 of gear box 36 provides a bearing support for the end of shaft 45 which mounts the gear 46 and also provides a bearing support for the end of flexible shaft 58 carrying the gear 57 which meshes with gear 56 on shaft 55. The frame 66 also provides a bearing support (not shown) for shaft 55 and a bearing support for the lower end of the rotor housing 34 to which is attached the gear 47. In addition, end bearings 66a and 66b serve to support the shaft 59 and housing 34 respectively.

The upper end of the rotor housing 34 supports a carriage generally designated by numeral 67. This carriage comprises a platform 67a to which are connected upright members 68 and 69 for supporting transverse bottom members 70 and 71. At the opposite ends of the bottom members 70, 71 are attached upright cross members 72 and 73. A threaded shaft 75 is located above bottom member 70 and has its ends rotatably supported in cross members 72 and 73 and a threaded shaft 76 is located above bottom member 71 and has its ends rotatably mounted in the cross members. Shafts 75 and 76 carry bevelled gears 77 and 78, respectively, near one end thereof and these gears mesh with bevelled gears 79 and 80, respectively, secured to opposite ends of a shaft 81. The shaft 81 is rotatably mounted by projections 82 and 83 extending from cross member 73 and a bevelled gear 84 is secured to shaft 81 at a location intermediate the projections in order to mesh with a bevelled gear 85 secured to the end of flexible shaft 58. The upright member 69 is extended beyond platform 67a to provide an opening 86 for the end of the shaft 58 carrying the gear 85.

The rotation of flexible shaft 58 will cause rotation of shaft 81 which will in turn rotate threaded shafts 75 and 76 in opposite directions. Shafts 75 and 76 pass through threaded openings in lugs 87 and 88, respectively, and these shafts are threaded in opposite directions so that rotation of the shafts in opposite directions by shaft 81 will cause the lugs to move along the shafts in the same direction and by the same amount. The upper end of lug 87 has an opening 89 which loosely receives one end of a pin 90 and the other end of this pin is secured to a collar 91 surrounding a cover member 92. Also, the upper end of lug 88 has an opening 93 loosely receiving one end of a pin 94 and the other end of the pin is rigidly secured to the collar 91. The collar 91 is slidable upon the cover member 92 so that movement of the lugs 87 and 88 will move the collar 91 along the carriage 67 in order to adjust the angle of the cover member 92.

The upper end of rotor shaft 59 connects with a rotor shaft extension 95 through a universal coupling 96 located above platform 67a. This universal coupling is of well known construction and comprises V-shaped projections 97 and 98 from shaft 59 and shaft extension 95, respectively. A first pin 99 extends between the arms of projection 98 and the projection 97 is connected to the first pin by a second pin 100 so that the shaft extension 95 can be tilted at an angle to shaft 59 without interrupting the transfer of the rotational force from shaft 59 to shaft extension 95. The cover member 92 is rigidly secured at one end to a differential gear housing 101 and the shaft extension 95 is rotatably mounted by bearings 102. The shaft extension 95 extends through the differential housing and carries a gear 104 which meshes with differential gears 105 and 106 rotatably mounted on the side walls of the housing 101. These gears in turn mesh with a gear 107 which is secured to a rotor hub 108, which surrounds the upper end of shaft extension 95. This rotor hub 108 is attached to the counter rotating rotor 109 which is spaced from the differential housing by a thrust plate 110 and a thrust bearing 111. Ball bearings 112 and 113 are located between hub 108 and shaft extension 95 to support the hub and permit the counter rotation. The upper end of shaft extension 95 passes through rotor 114 located between plates 115 and 116 and a bearing 118 is located between plate 116 and plate 117 at the upper end of rotor 109. Also, plate 117 carries bearing 119 for shaft extension 95 and a nut 95a on the end of shaft extension 95 serves to hold the rotors in position. During rotation of the shaft 59 by the power shaft 35, the hub 108 will be rotated in the opposite direction to shaft extension 95 and the rotors 109 and 114, each comprising a plurality of blades, will rotate in opposite directions. The shaft extension 95 can be tilted to any desired angle with respect to the shaft 59 by rotation of the threaded shafts 75 and 76 to move lugs 87 and 88. This movement will cause the collar 91 to exert a tilting force on the cover member 92, and the collar 91 will slide along the cover member as it tilts about the universal joint 96. The cover member 92 carries oppositely extending pins 120 and 121 (see FIGURE 7) which are pivotally contained in openings in upright members 122 and 123, respectively, which are secured to platform 67a. The pins serve to pivotally mount the cover member and to support and prevent rotation of gear housing 101.

The operation of the helicopter will now be described. Upon starting the engine 23, the rotor shaft 59 will be rotated to drive the rotors 109 and 114 in opposite directions and the helicopter will have practically no weight unbalance about the axis of rotor shaft 59 due to the fact that the engine is mounted aft of the axis and the pilot sits forward of the axis. The pilot can select the direction of flight by actuation of foot pads 42 and 43 in order to rotate shaft 45 and thus rotate the carriage 67 secured to the casing 34. Thereafter, the pilot can tilt the rotor shaft extension 95 in the direction of flight by an amount determined by the movement of lever 48. As previously described, rotation of lever 48 causes rotation of flexible shaft 58 and translation of the lugs 87 and 88 in order to tilt the cover member 92 and shaft extension 95 relative to the carriage 67. Thus, the direction and amount of tilt of the rotors and shaft extension 95 is continually under control of the pilot and the direction and forward speed of the helicopter can be quickly and easily varied in a desired manner. The shaft 58 is constructed of a flexible material to permit rotation of carriage 67 relative to the gear box 36 and it is understood that any suitable shaft arrangement can be provided for this purpose.

For stability and yawing purposes, a pair of fins 124 and 125 can be pivotally mounted on the frame 19 by angular stub shafts 126 secured to the frame. Each of the shafts 126 extend rearwardly at about forty-five degrees and are received by a socket 127 in each fin so that the fins can move about the axis of the shafts 126. The fins are secured together by a cross bar 128 which is connected by a ball and socket joint to the rear edge of each fin so that movement of the cross bar will move the fins together. An extendable link 129 connects at one end with a collar 130 which is slidable along support member 22 by control cables 131 and 132, which are connected with a suitable pilot control mechanism. The other end of link 129 is pivotally secured to a reduced section of cross bar 128 so that movement of collar 130 can be transmitted into tilting movement of the fins. The down draft from the rotors acting on the fins will produce a yawing force on the frame 10 in a direction determined by the direction of tilt of the fins.

While counter rotating blades are illustrated, it is understood that a single rotor can be utilized. Also, a suitable tail boom can be attached at the rear end of frame 10 when a single rotor is utilized along with the fins. Also, other suitable fin arrangements can be employed. It is apparent that any suitable linkages can be utilized to accomplish rotation of carriage 67 and movement of the shaft extension 95 angularly by the carriage. Further, the invention is not limited to a particular frame construction or to particular control actuators for the control mechanism, since it is apparent that automatic flight control instruments could be utilized to rotate carriage 67 and tilt the shaft extension 95.

Various other modifications are contemplated by those skilled in the art without departing from the spirit and scope of the invention as hereinafter defined by the appended claims.

What is claimed is:

1. A control mechanism for a helicopter comprising a rotor shaft, a universal coupling for dividing said rotor shaft into upper and lower sections, a housing surrounding the lower section of said rotor shaft and rotatable relative thereto, and carriage means secured to said housing and rotatable with said housing, said carriage means comprising means for moving the upper section of said rotor shaft angularly with respect to said lower section so that the direction of tilt of said upper section is determined by the position of said carriage and the angle of tilt is adjustable by said moving means, said moving means comprising a pair of rotatable threaded shafts spaced apart on said carriage, lug means threaded to each of said shafts and rotatably supporting a collar extending between said lug means, means for rotating each of said threaded shafts to translate said lug means along said shafts, and means slidably engaged by said collar and movable with the upper section of said shaft for tilting said upper section by an amount determined by the position of said lug means on said threaded shafts.

2. A control mechanism as defined in claim 1 having a differential mechanism driven by the upper section of said shaft, hub means rotatable by said differential mechanism in a direction opposite to the direction of rotation of said upper section, and separate rotor means connected to said upper section and to said hub means.

3. A control mechanism as defined in claim 1 wherein said means for rotating said shafts comprises shaft means mounted on said carriage transverse to said threaded shafts, gear means for connecting said transverse shaft means to each of said threaded shafts, and means for rotating said transverse shaft to select the position of said lug means on said threaded shafts.

4. A control mechanism for a helicopter comprising a rotor shaft, a universal coupling for dividing said rotor shaft into upper and lower sections, a housing surrounding the lower section of said rotor shaft and rotatable relative thereto, carriage means secured to said housing and rotatable with said housing, and means for angularly positioning said housing and said carriage means with respect to said lower section of said shaft, said carriage means comprising means for moving the upper section of said rotor shaft angularly with respect to said lower section so that the direction of tilt of said upper section is determined by the position of said carriage means as controlled by said positioning means and the angle of tilt is adjustable by said moving means.

5. A control mechanism for a helicopter comprising a rotor shaft, a universal coupling for dividing said rotor shaft into upper and lower sections, means rotatable about the axis of said rotor shaft, carriage means secured to said rotatable means for rotation therewith, means supported by said carriage means for tilting the upper section of said rotor shaft in a single plane with respect to said carriage means and angularly with respect to said lower section, and means for positioning said rotatable means and said carriage to determine the direction of tilt of said upper section by said tilting means.

6. A control mechanism for a helicopter comprising a rotor shaft, a universal coupling for dividing said rotor shaft into upper and lower sections, means movable relative to said shaft into various angular positions with respect to said shaft, carriage means secured to said movable means for movement therewith, said carriage means comprising means for tilting the upper section of said rotor shaft angularly with respect to said lower section so that the direction of tilt of said upper section is determined by the angular position of said carriage and the angle of tilt is adjustable by said tilting means, and a cover member surrounding said upper section of said rotor shaft, said tilting means comprising a collar slidably mounted on said cover member and means for moving said collar in order to tilt said upper section.

7. A control mechanism for a helicopter comprising a rotor shaft, a universal coupling for dividing said rotor shaft into upper and lower sections, means movable relative to said shaft into various angular positions with respect to said shaft, carriage means secured to said movable means for movement therewith, said carriage means comprising means for tilting the upper section of said rotor shaft angularly with respect to said lower section so that the direction of tilt of said upper section is determined by the angular position of said carriage and the angle of tilt is adjustable by said tilting means, first control means movable to move said tilting means, and second control means for moving said movable means and carriage means.

References Cited in the file of this patent

UNITED STATES PATENTS

| | | |
|---|---|---|
| 2,487,020 | Gilcrease | Nov. 1, 1949 |
| 2,514,206 | Perry | Nov. 4, 1950 |
| 2,518,623 | Judge | Aug. 15, 1950 |
| 2,669,308 | Thomson | Feb. 16, 1954 |
| 2,695,674 | Kaman | Nov. 30, 1954 |
| 2,724,446 | Hill | Nov. 22, 1955 |